No. 827,261.

PATENTED JULY 31, 1906.

R. B. NORTH.
SPEED INDICATOR.
APPLICATION FILED DEC. 13, 1904.

2 SHEETS—SHEET 1.

Witnesses.

Inventor.
Robert Benson North.
by ———— Attys.

No. 827,261. PATENTED JULY 31, 1906.
R. B. NORTH.
SPEED INDICATOR.
APPLICATION FILED DEC. 13, 1904.
2 SHEETS—SHEET 2.
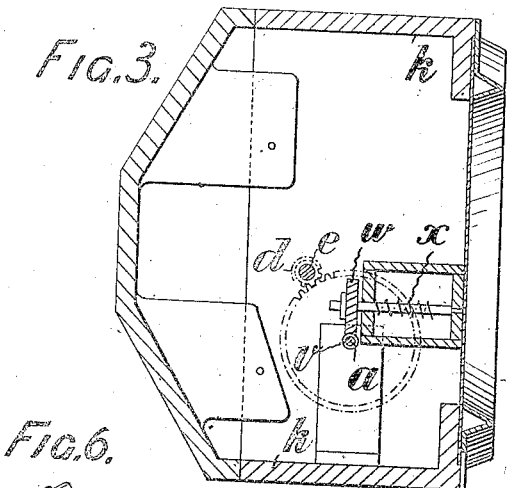
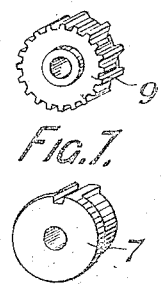
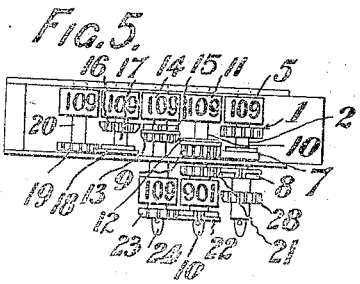
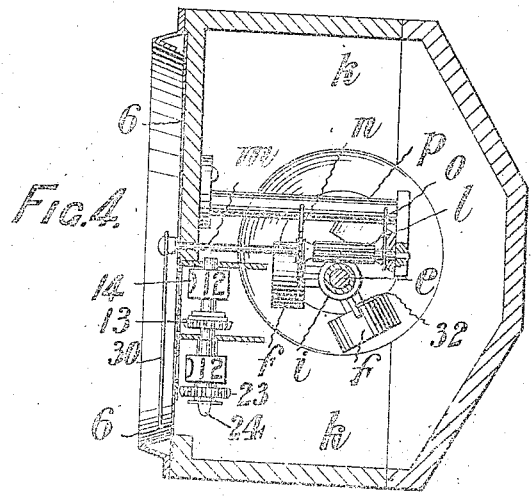
Witnesses.
Inventor.
Robert Benson North.

UNITED STATES PATENT OFFICE.

ROBERT BENSON NORTH, OF SOHO, ENGLAND.

SPEED-INDICATOR.

No. 827,261.

Specification of Letters Patent.

Patented July 31, 1906.

Application filed December 13, 1904. Serial No. 236,688.

*To all whom it may concern:*

Be it known that I, ROBERT BENSON NORTH, a subject of the King of Great Britain, residing at No. 14 Soho Square, Soho, in the county of Middlesex, England, have invented certain new and useful Improvements in Speed-Indicators; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

These improvements have for object to provide an improved indicator for showing the speed of motors or other rotating machinery or of vehicles propelled by motors in order to show on a dial or scale the speed in number of revolutions per minute, the said indicator being of the type in which a governor device is employed, so as to compress a plurality of different strengths, one after the other. Or as regards a motor-car or other vehicle the speed in miles run per hour may be indicated with or without means for also showing the number of revolutions of the motor, and a cyclometer for indicating the number of miles run may also be combined therewith. It is also evident that the invention may be employed for indicating the speed of cutting in lathes and other machinery.

In order that the invention may be more easily understood, the same is illustrated with reference to the accompanying drawings, of which—

Figure 1:
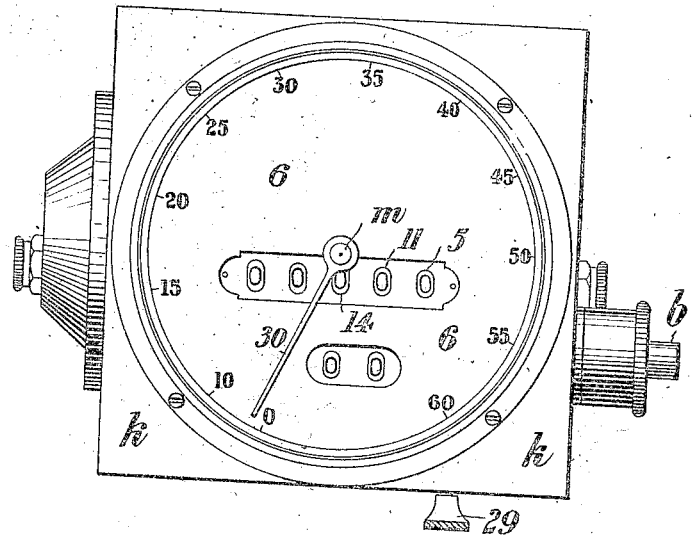
Figure 2:
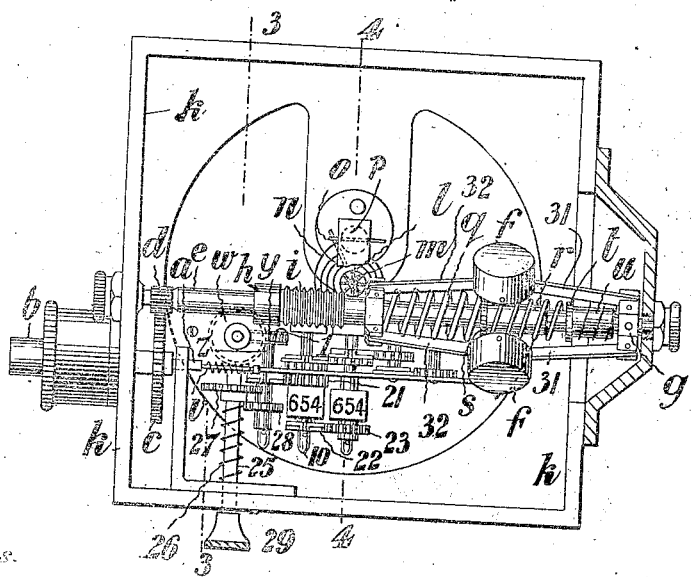

Figure 1 is an elevation of an apparatus suitable for application to a motor-car or other vehicle with means for indicating the speed of the vehicle in miles per hour, the total number of miles and fractions of miles run, and the total number of miles run on the trip. Fig. 2 is a rear elevation, partly in section, with the back or cover removed. Fig. 3 is a left-hand vertical section on the line 3 3 of Fig. 2. Fig. 4 is a vertical section on the line 4 4 of Fig. 2. Fig. 5 is an elevation of the cyclometer-gear; and Figs. 6 and 7 are perspective views of two of the wheels used in same; but the cyclometer-gear in itself forms no part of this invention and is only illustrated and described for the purpose of showing how such gear may be applied to the speed-indicator.

It may here be stated that the invention has for its principal object to provide an indicator suitable for a motor-car or the like, where the speed is very variable and where it is desirable to indicate accurately both at a slow speed of a few miles and at a quick speed of, say, twenty to forty miles an hour or more.

A spindle $a$ is provided, which is mounted in a bearing in the casing or frame $k$, rotated through a coupling $b$ by flexible shafting or other suitable transmission-gear from the engine or machine the speed of which is to be indicated, or the flexible shafting may be provided with a friction-wheel adapted to run on the nave or other part of a wheel or on the work to be turned—in the case of a lathe, for example. This spindle $a$ has a toothed wheel $c$ mounted thereon, which gears with a pinion $d$, mounted on a spindle $e$, also mounted in bearings in the casing. Upon this spindle $e$ is mounted a centrifugal governor, having, for instance, weights or balls $f$, connected by links 31 to the governor-head $g$ and by links 32 to a movable sleeve $h$. The governor-head $g$ is fixed to one end of the spindle $e$, and the movable sleeve $h$ is provided with a circular rack $i$, which gears or comes into gear with a pinion $l$ on a spindle $m$, which, in the construction shown, is the spindle upon which the hand or pointer 30 is mounted, or intermediate gearing may be provided. In order to bring the pointer back to zero, the spindle $m$ has a spring $n$, the other end of which is fixed to the post $p$, and a stop $o$, which comes into contact with the said post when zero is reached. To counteract the centrifugal force, a helical spring, a sleeve, and a collar are provided on the governor-spindle, against which collar the spring is compressed when the centrifugal force begins to act, whereby the rack comes into gear with the pinion and turns it, the amount of movement being indicated on the dial by the hand on the pinion-spindle. This arrangement suffices for a slow or not very variable speed; but for a higher or more variable or greatly-variable speed one or more additional helical springs of stepwise-increased strength are employed, as shown on the drawings, in which the movable sleeve or collar $h$ is in contact with a strong spring $q$, between which and the next spring $r$ there is a collar $s$, and there is similarly a collar $t$ between the spring $u$ and the spring $r$, and so that the second spring $r$ comes into action when the first spring $u$ has been so far compressed as may be fairly in accordance with its strength, and when the second and stronger spring r has been similarly compressed to its fair limit the third and still stronger spring q comes into action. These two additional springs are by preference arranged around the governor-spindle, as shown, one of them, the spring q, acting against the sleeve or collar h, loose on the spindle e, and the other spring u acting against the governor-head g.

With the apparatus so far described may be combined any suitable construction of counter-cyclometer or train of wheels with indicating device for showing the number of revolutions made or miles run. A suitable arrangement is shown, and it consists in providing the spindle a with a worm v, which gears with a worm-wheel w, on the spindle of which there is another worm x, Fig. 3, which drives a toothed wheel y, mounted on a spindle z. The said wheel y gears with a toothed wheel 1, mounted on a spindle 2. This spindle 2 (best seen in Fig. 5) carries a numbered drum 5 for showing tenths of a mile through a slot in the dial 6, Fig. 1. The said spindle 2 also carries two wheels marked 7 and 8, Fig. 5, having one tooth each and of which one is shown to an enlarged scale in Fig. 7. As seen in Fig. 5, the wheel 7 gears once during each revolution with a wheel 9, mounted on a spindle 10, which carries the drum 11 for showing units of miles. The wheel 9 has twenty teeth, and every other one of these is partly cut away, as shown in Fig. 6. The wheel 7 has two teeth and a flange of the same depth as the teeth. When neither of the teeth is in gear with the teeth on the wheel 9, the flange is practically in contact with the outer edges of two entire teeth on the wheel 9 a partly-cut-away tooth in the latter permitting thereof, and the result is the wheel 9 is prevented from revolving; but as soon as the two teeth in the wheel 7 engage with the wheel 9 the latter is turned a distance of two teeth. Then the flange on the wheel 7 again comes into contact with the outer edges of two entire teeth holding the wheel 9 locked, and so on. The drum 11 makes one-tenth of a revolution for each revolution of the wheel 7. The spindle 10 has a wheel 12 with a single tooth which gears with a toothed wheel marked 13, the spindle of which carries a drum marked 14 to indicate tens of miles. The spindle of the drum 14 has mounted thereon a single-toothed wheel 15, which gears with a toothed wheel 16 on a spindle 17, carrying a drum to indicate hundreds of miles. This spindle 17 similarly carries a single-toothed wheel 18, which gears with a toothed wheel 19, mounted on a spindle 20, carrying a drum to indicate thousands of miles. In order to be able to indicate the number of miles run during any desired period, such as during a day or a part of a day, another cyclometer apparatus is employed which may be set to zero when desired. Such an arrangement consists, for instance, of a toothed wheel 21, having a drum mounted on its sleeve, which sleeve is revoluble on the spindle 10. This drum shows units of miles. The sleeve of the wheel 21 is friction-tight on the spindle 10 and gears with the single-toothed wheel 8 on the spindle 2. The sleeve-carrying wheel 21 also has mounted thereon the single-toothed wheel 22, which gears with the toothed wheel 23, loose on the spindle 24, the drum of which indicates tens of miles, so that these two drums may easily be set to zero when the spindle 25 is withdrawn against the action of the spring 26 until the wheel 27 on the said spindle 25 gears with wheel 28 made in one with the wheel 8, which is revoluble but friction-tight on the spindle 2, and on turning the milled head 29 the wheels which are on the three spindles 2, 10, and 24 may be revolved until the two drums register zero.

What I claim as my invention, and desire to secure by Letters Patent, is—

1. In a speed-indicator, the combination with a driven governor-spindle; of a governor secured at one end to the shaft, a sliding sleeve on the spindle, a rack on the sleeve and rotatable therewith, a plurality of springs of different strengths on the spindle adapted to be successively compressed by the sleeve when the governor moves outward by increase of speed, and an indicator directly operated by the sliding movement of the rotating rack, substantially as described.

2. In a speed-indicator, the combination with a driven governor-spindle; of a governor-head fixed on the spindle, governor-weights, arms connecting the weights and head, a sliding sleeve on said shaft, arms connecting the governor-weights to said sleeve, a plurality of springs of different strength surrounding the spindle and between the sleeve and governor-head, successively compressed by the outward movement of the weights, a rack on the sleeve and a pointer directly operated by said rack.

In testimony whereof I have signed my name to this specification in the presence of two subscribing witnesses.

ROBERT BENSON NORTH.

Witnesses:
REGINALD SMITH,
VICTOR JENSEN.